United States Patent
Chiu et al.

(10) Patent No.: US 10,255,224 B1
(45) Date of Patent: Apr. 9, 2019

(54) INTELLIGENT PCIE SLOT LANE ASSIGNMENT METHOD

(71) Applicant: ADLINK TECHNOLOGY INC., New Taipei (TW)

(72) Inventors: Hsien-Kuang Chiu, New Taipei (TW); Peng-Yuan Chu, New Taipei (TW); Yi-Kuo Chen, New Taipei (TW); Chien-Chih Chen, New Taipei (TW); Chien-Yi Hsu, New Taipei (TW)

(73) Assignee: ADLINK TECHNOLOGY INC., New Taipei (TW)

( * ) Notice: Subject to any disclaimer, the term of this patent is extended or adjusted under 35 U.S.C. 154(b) by 0 days.

(21) Appl. No.: 15/853,299

(22) Filed: Dec. 22, 2017

(51) Int. Cl.
G06F 13/12 (2006.01)
G06F 13/40 (2006.01)
G06F 13/36 (2006.01)
G06F 13/42 (2006.01)

(52) U.S. Cl.
CPC .......... *G06F 13/4068* (2013.01); *G06F 13/36* (2013.01); *G06F 13/4022* (2013.01); *G06F 13/4282* (2013.01); *G06F 2213/0026* (2013.01)

(58) Field of Classification Search
CPC ............. G06F 13/4022; G06F 13/4282; G06F 13/4068; G06F 13/4221
USPC ................................................. 710/301, 313
See application file for complete search history.

(56) References Cited

U.S. PATENT DOCUMENTS

| | | | | |
|---|---|---|---|---|
| 2007/0294454 A1* | 12/2007 | Danilak | .................... | G06F 3/14 710/305 |
| 2008/0005706 A1* | 1/2008 | Sharma | ............... | G06F 11/0745 716/136 |
| 2013/0346665 A1* | 12/2013 | Freking | ................. | G06F 9/4411 710/313 |
| 2014/0059265 A1* | 2/2014 | Iyer | ....................... | G06F 9/5011 710/313 |
| 2016/0179741 A1* | 6/2016 | Wietfeldt | ............ | G06F 13/4221 710/313 |
| 2016/0335216 A1* | 11/2016 | Krishnan | ............. | G06F 13/4027 |
| 2017/0017585 A1* | 1/2017 | Iyer | ....................... | G06F 13/161 |
| 2018/0011713 A1* | 1/2018 | Sun | ....................... | G06F 9/4401 |

* cited by examiner

*Primary Examiner* — Titus Wong
(74) *Attorney, Agent, or Firm* — Muncy, Geissler, Olds & Lowe, P.C.

(57) ABSTRACT

An intelligent PCIe slot lane assignment method applied to a motherboard including a CPU capable of providing at least 16 lanes, a switch circuit, a PCIe slot assembly consisting of a first PCIe slot, a second PCIe slot and a third PCIe slot, and a logic controller. The intelligent control of the logic controller in detection of the insertion of a PCIe expansion card in the first PCIe slot, second PCIe slot and third PCIe slot of the PCIe slot assembly enables the switch circuit to automatically assign lanes to the first PCIe slot, second PCIe slot and third PCIe slot of the PCIe slot assembly according to the detection results, increasing the convenience of expansion application and having a higher performance and expansibility.

10 Claims, 4 Drawing Sheets

INTELLIGENT PCIE SLOT LANE ASSIGNMENT METHOD

BACKGROUND OF THE INVENTION

1. Field of the Invention

The present invention relates to PCIe technology and more particularly, to an intelligent PCIe slot lane assignment method, which uses a logic controller to detect the insertion of one or multiple PCIe expansion cards in a PCIe slot assembly, enabling a switch circuit to automatically assign lanes to respective PCIe slots of the PCIe slot assembly according to the detection result, avoiding manual adjustment and increasing the ease of expansion of the application.

2. Description of the Related Art

With the rapid development of electronic technology at the present time, the computing speed and performance of modern computers and servers become faster and faster. A computer system has CPU and memory in the motherboard for data processing and storage, display screen for data display and modem for modulating carrier wave signals to encode digital information for transmission and demodulates signal to decode the transmitted information. A motherboard for computer or server is generally equipped with slots for the mounting of interface cards for data transmission between electronic devices.

With the increasing speed of computers or data processing systems, PCI Express (Fast Peripheral Component Interconnect, hereinafter referred to as PCIe) is used in large quantities. PCIe is a high-speed serial computer expansion bus standard designed to replace the older bus standards for data input and output to improve computer internal bus transmission speed. Different bandwidth PCIe designs (PCIe x1, PCIe x4, PCIe x8, PCIe x16) are created to satisfy different application requirements. For example, PCIe x16 is designed for graphic card application. PCIe interface uses serial signal point-to-point connection transmission mode, and establishes a dedicated lane between devices. The numeral indicates the number of lane the PCIe interface supports for two-way transmission, for example, PCIe x1 provides one single lane, PCIe x2 provides two lanes, so on and so forth, and thus, PCIe x16 provides a wide bandwidth of 16 lanes. In a computer or data processing system, a motherboard provides different PCIe slots to satisfy PCIe 3.0 interface connection bandwidth requirements. In this case, PCIe x4, PCIe x8 and PCIe x16 slots are used. Different PCIe slot arrangements can be employed for different applications. However, the general PCIe interface transmission bandwidth limit often comes from the provided number of PCIe lanes, which has a direct concern with the number of lanes the CPU and chip set can provide.

In a computer system, the CPU of the motherboard can provide 16 PCIe lanes to one PCIe x16 slot or two PCIe x8 slots, or to one PCIe x8 slot and two PCIe x4 slots. At the time the motherboard is designed, the lane assignment has decided, and therefore, the number of lanes a PCIe slot can provide is fixed. If the user wants to use a PCIe x16 slot but the motherboard simply can provide one PCIe x8 slot, the other lanes will be assigned to other PCIe slots, and this will cause the inserted PCIe x16 expansion card to automatically drop the frequency, thus, the performance of the inserted PCIe x16 expansion card will not be fully carried out. If the user uses two or more PCIe expansion cards and the motherboard simply has one PCIe x16 slot, the desired expansion will not be achieved, affecting system performance and expansibility.

To solve the above problems, a switch circuit may be added to the motherboard for assigning PCIe lanes, enabling the total 16 PCIe lanes of the CPU to be connected to the PCIe slots. However, under this situation, the user needs to operate a jumper for controlling the switching of the switch circuit so that the set PCIe slots can provide the needed PCIe lanes. This manner can achieve high performance and expansibility. However, the user must know the number of lanes each PCIe expansion card can support and needs to refer to the operation manual of the motherboard before operation so that the jumper can be operated to reach the accurate position or the desired settings. If the jumper position is not accurately adjusted, it will affect the linking between the PCIe slot and the PCIe expansion card, limiting the overall system performance. An improvement in this regard is necessary.

SUMMARY OF THE INVENTION

The present invention has been accomplished under the circumstances in view. It is therefore the main object of the present invention to provide an intelligent PCIe slot lane assignment method, which employs intelligent control to flexibly configure the lane resources, so that the user does not need to manually adjust the lane control switches of the motherboard, increasing the ease of expansion of the application and enhancing high performance.

To achieve this and other objects of the present invention, an intelligent PCIe slot lane assignment method is applied to a motherboard including a CPU capable of providing at least 16 lanes, a switch circuit, a PCIe slot assembly consisting of a first PCIe slot, a second PCIe slot and a third PCIe slot, and a logic controller. The intelligent control of the logic controller in detection of the insertion of a PCIe expansion card in the first PCIe slot, second PCIe slot and third PCIe slot of the PCIe slot assembly enables the switch circuit to automatically assign lanes to the first PCIe slot, second PCIe slot and third PCIe slot of the PCIe slot assembly according to the detection results. The design of using the logic controller to automatically detect the insertion of one or multiple PCIe expansion cards in the PCIe slot assembly of the motherboard and to control the switch circuit in assigning lanes eliminates the use of a jumper for manually switching lanes in the motherboard, achieving flexible arrangement of lanes according to the bandwidth of the loaded PCIe expansion card, increasing the convenience of expansion application, but also having a higher performance and expansibility to satisfy user needs.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
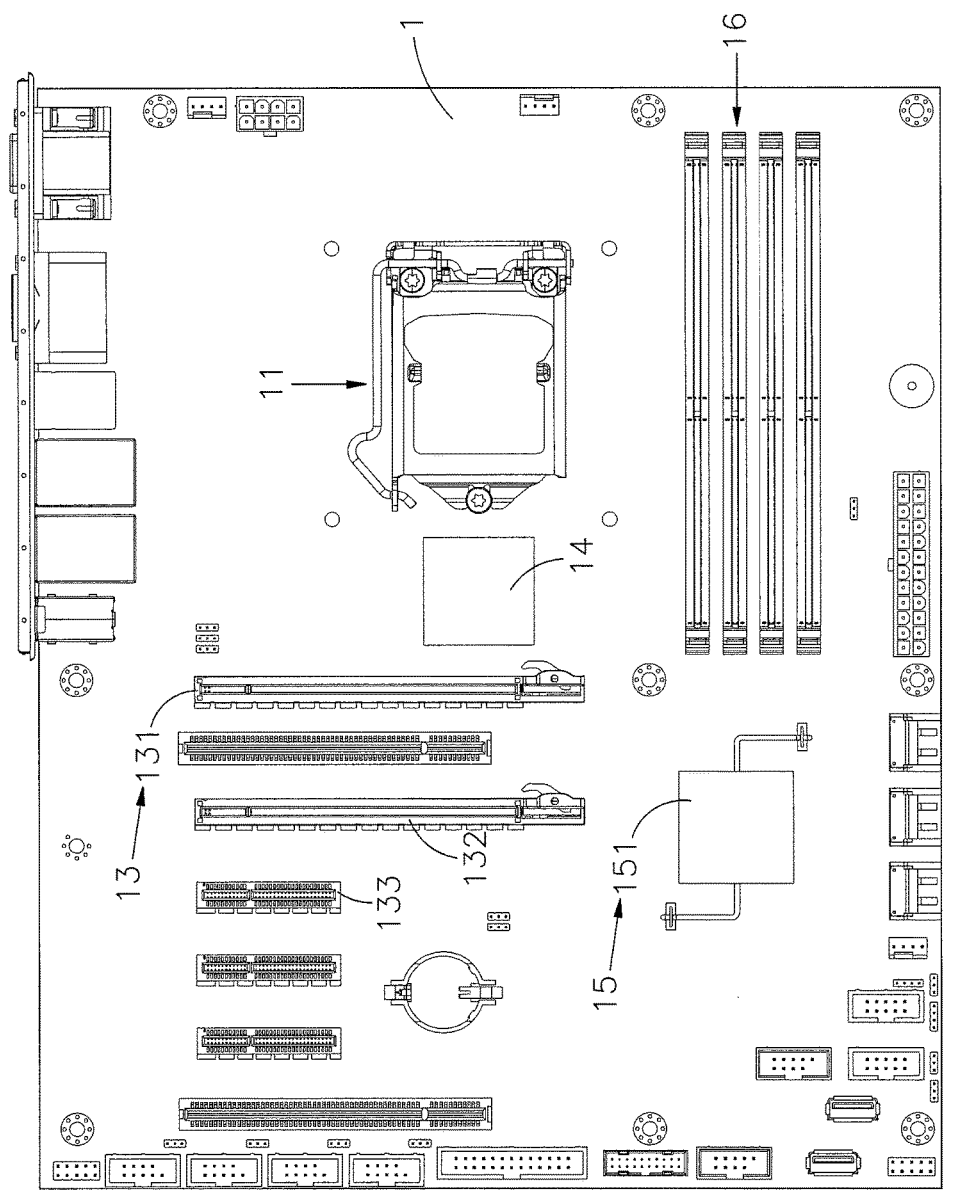
FIG. 1 is a schematic structural view of a computer system embodying the present invention.
Figure 2:
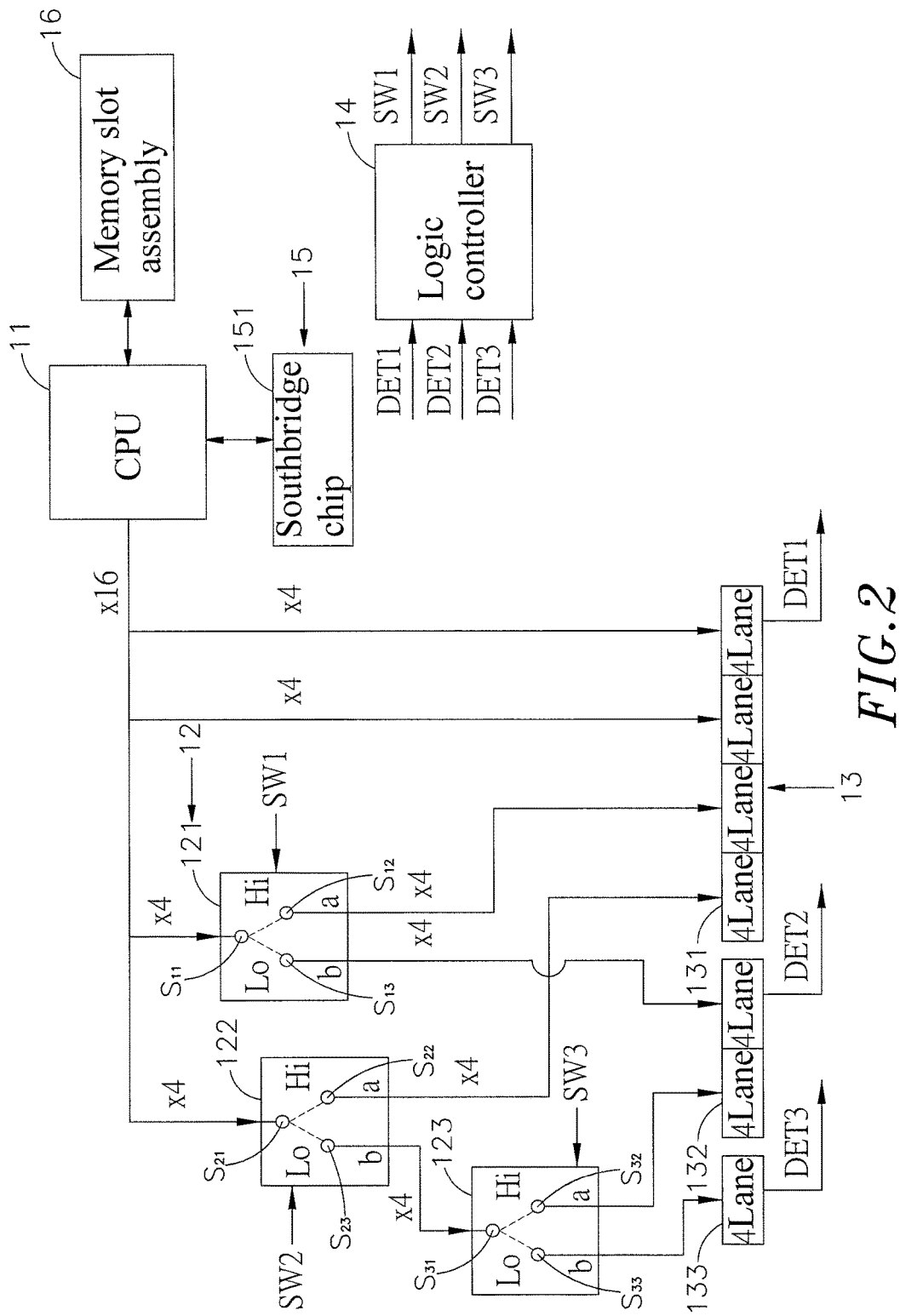
FIG. 2 is a circuit block diagram of the computer system shown in FIG. 1.
Figure 3:
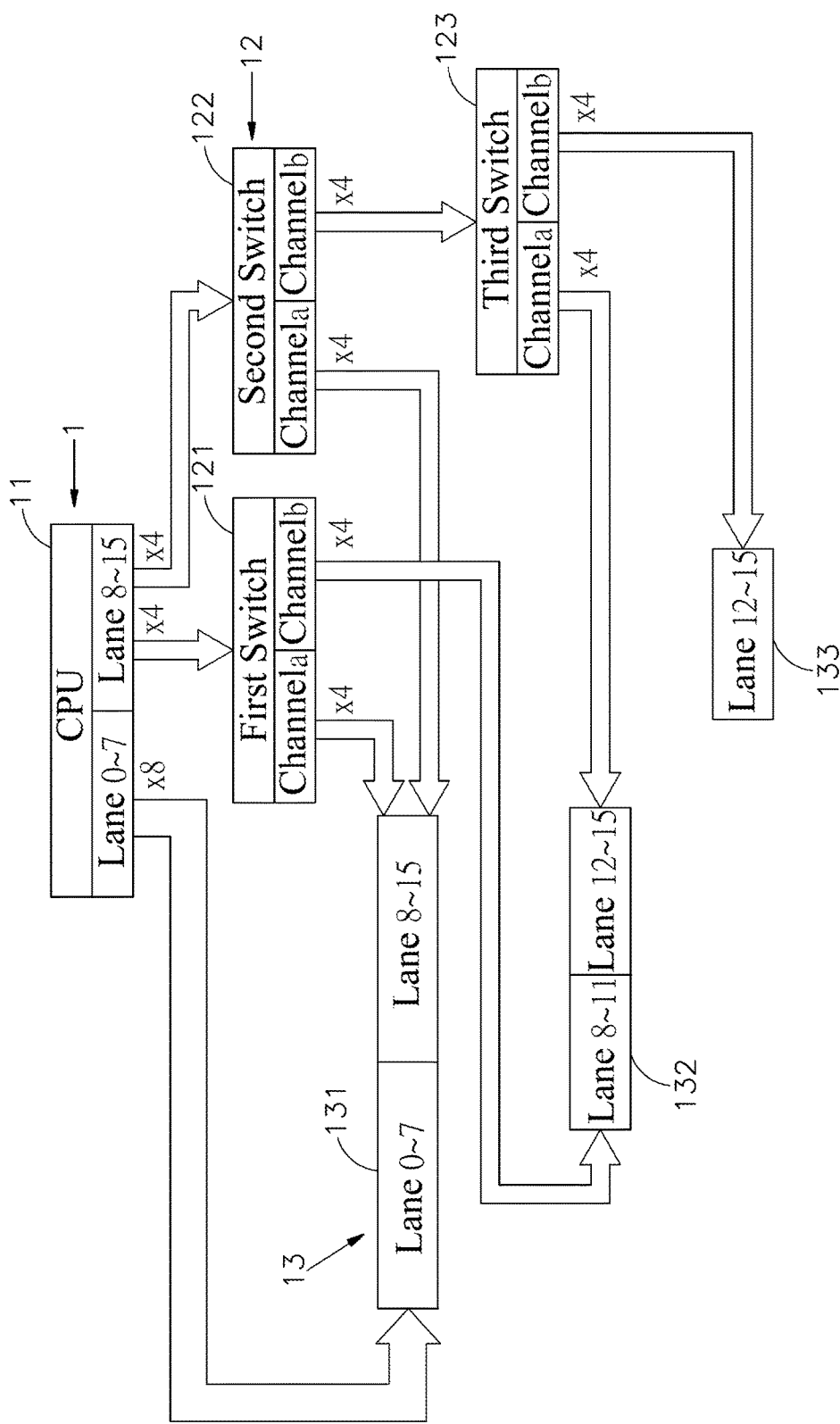
FIG. 3 illustrates the PCIe slot lane arrangement architecture of the present invention.
Figure 4:
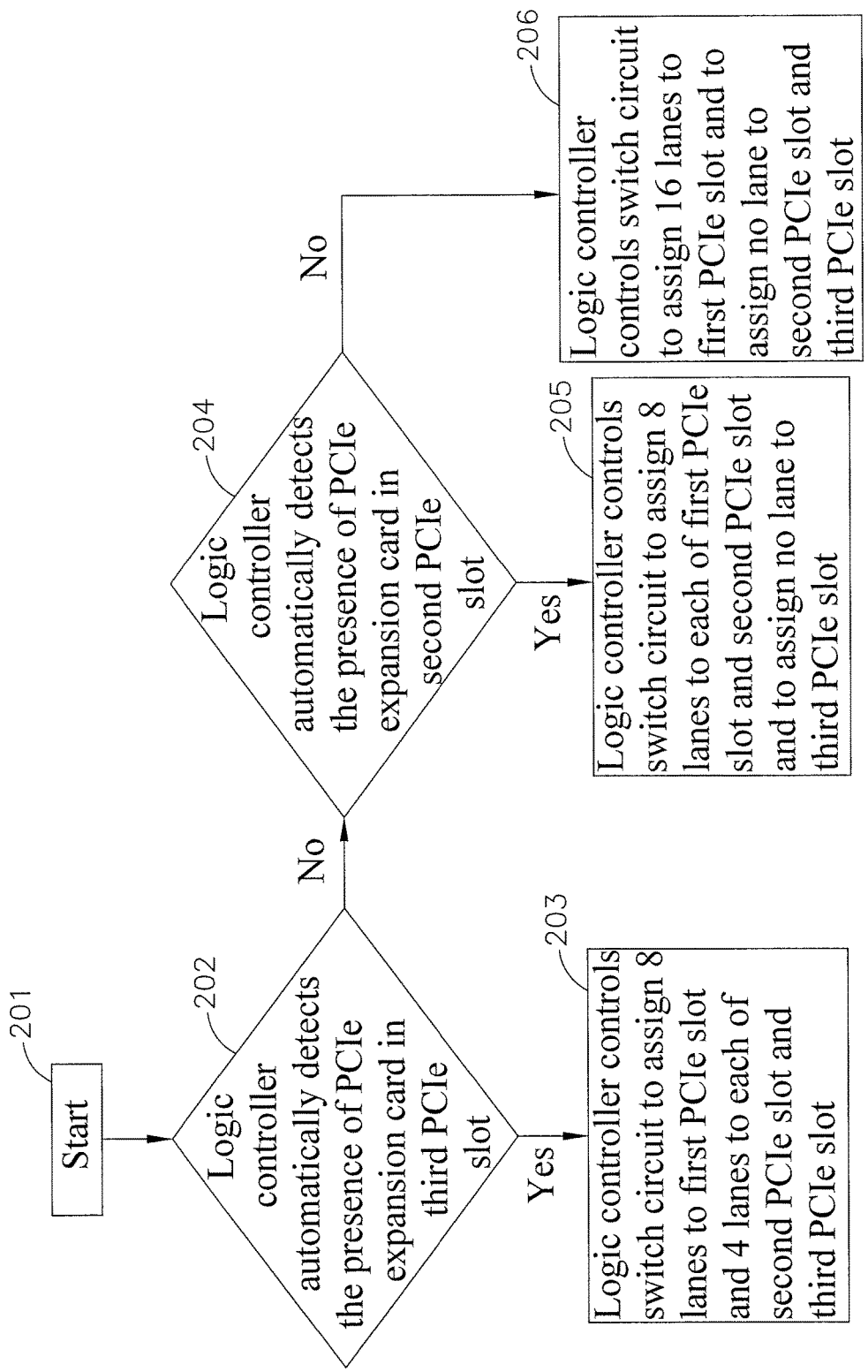
FIG. 4 is an intelligent PCIe slot lane auto assignment flow chart of the present invention

Referring to FIGS. 1-4, a schematic computer system structural view, a computer system circuit block diagram, a PCIe slot lane arrangement architecture and an intelligent PCIe slot lane auto assignment flow chart of the present invention are shown. A computer system using the intelligent PCIe slot lane assignment method of the present invention can be, but not limited to, a personal computer, industrial computer or servo computer. The motherboard 1 of the computer system comprises a CPU (Central Processing Unit) 11, a switch circuit 12, a PCIe (Peripheral Component Interconnect Express; also officially abbreviated as PCI-E) slot assembly 13 and a logic controller 14. The CPU 11 can provide at least 4 sets of PCIe 3.0×4 total 16 lane signals, wherein two sets of PCIe 3.0×4 lanes are electrically connected to two ×4 lanes of the first PCIe slot 131 of the PCIe slot assembly 13 that meets PCIe 3.0×16 specifications, and the other two sets of PCIe 3.0×4 lanes are respectively electrically connected to first switch 121 and second switch 122 of the switch circuit 12. The first switch 121 and the second switch 122 have the respective first contacts $S_{11}, S_{21}$ of the input terminal thereof electrically connected to the CPU 11, the respective second contacts $S_{12}, S_{22}$ of one output terminal thereof electrically connected to the other two sets of ×4 lanes of the first PCIe slot 131. The third contact $S_{13}$ of the other output terminal of the first switch 121 is electrically connected to one ×4 lanes of the second PCIe slot 132 that meets the PCIe 3.0×8 specifications. The third contact $S_{23}$ of the other output terminal of the second switch 122 is electrically connected to the first contact $S_{31}$ of the input terminal of the third switch 123. The second contact $S_{32}$ of one output terminal of the third switch 123 is electrically connected to the other ×4 lanes of the second PCIe slot 132. The third contact $S_{33}$ of the other output terminal of the third switch 123 is electrically connected to the third PCIe slot 133 that meets PCIe 3.0×4 specifications. The logic controller 14 is electrically connected to the switch circuit 12 and the PCIe slot assembly 13 for switching on/off the first switch 121, the second switch 122 and the third switch 123 respectively.

In the present preferred embodiment, the PCIe slot assembly 13 distinguishes the size of its bandwidth by length, such as ×1, ×4, ×8, ×16, ×32, wherein ×4 represents the total bandwidth of 4 lanes; ×16 represents the total bandwidth of 16 lanes. In an example of the specification of PCIe 3.0×4, the maximum bandwidth for two-way transmission can be as large as 3.938 GB/s; the maximum bandwidth for PCIe 3.0×8 can be as large as 7.877 GB/s; the maximum bandwidth for PCIe 3.0×16 can be as large as 15.754 GB/s. Different versions of PCIe have different lane bandwidths. The built-in PCIe controller of the CPU 11 can match the PCIe slot assembly 13 to control lane bandwidth. However, in actual application, the motherboard 1 can be configured to change the number and arrangement of the lanes of the PCIe slot assembly 13 according to structural design requirements.

Further, the logic controller 14 is installed in the motherboard 1 having command storage, logical operation implementation and sequential control functions for controlling the switch circuit 12 to assign the order of the 16 lanes provided by the CPU 11. Further, the logic controller 14 can be separately mounted in the motherboard 1, or directly integrated into a chipset 15 to constitute a system-on-chip (SoC), modularizing the overall circuit design and reducing the occupation of the motherboard 1 on space and circuit layout The motherboard 1 further comprises a chip set 15 and a memory slot assembly 16. The chipset 15 comprises a southbridge chip 151 directly integrated into the CPU 11 to solve the problem of compatibility between chips and to improve system efficiency. Thus, the southbridge chip 151 in the motherboard 1 is electrically connected to the memory slot assembly 16 by means of the CPU 11 to control its same clock and individual operating frequency and to support data transmission of the PCIe slot assembly 13. The southbridge chip 151 is electrically connected to the CPU 11 through a direct media interface (DMI) to work as an input/output controller hub (ICH), such as PCI controller, SATA controller, USB controller, sound controller, LAN controller, keyboard controller, etc. to achieve data transfer between external devices. Further, the southbridge chip 151 provides PCIe 2.0 lane bandwidth to support PCIe 2.0 PCIe slot specifications. In actual application, the specification described above is not a limitation, for example, the northbridge chip can be separately installed and electrically connected to the CPU 11 through a front side bus (FSB), and electrically connected to the memory slot assembly 16 through a bus or communication path. Further, the southbridge chip 151 is electrically connected to the northbridge chip through a direct media interface (DMI).

The intelligent PCIe slot lane assignment method is applied to the motherboard 1 of the computer system, comprising the steps of:

(201) Start.

(202) The logic controller 14 automatically detects whether there is a PCIe expansion card in the third PCIe slot 133? Thereafter, proceeds to step (203) if yes, or step (204) if not (203) The logic controller 14 controls the switch circuit 12 to assign 8 lanes to the first PCIe slot 131 and 4 lanes to each of the second PCIe slot 132 and the third PCIe slot 133.

(204) The logic controller 14 automatically detects whether there is a PCIe expansion card in the second PCIe slot 132? Thereafter, proceeds to step (205) if yes, or step (206) if not (205) The logic controller 14 controls the switch circuit 12 to assign 8 lanes to each of the first PCIe slot 131 and the second PCIe slot 132 and to assign no lane to the third PCIe slot 133.

(206) The logic controller 14 controls the switch circuit 12 to assign 16 lanes to the first PCIe slot 131 and to assign no lane to the second PCIe slot 132 and the third PCIe slot 133.

It is clear from the above steps that when the logic controller 14 controls the switch circuit 12 to assign the configuration according to the following Table I, the CPU 11 provides four PCIe 3.0×4 total 16 lane signals (Lane 0~7 and Lane 8~15) and assigns the lane signals to the first PCIe slot 131, second PCIe slot 132 and third PCIe slot 133 of the PCIe slot assembly 13, wherein the first PCIe slot 131, the second PCIe slot 132 and the third PCIe slot 133 can be PCIe ×16, PCIe ×8 and PCIe ×4 slots respectively. However, in actual application, the hardware architecture of the PCIe slot assembly 13 can be configured to include at least one PCIe ×16 slot and one or two PCIe ×8 slots.

The PCIe slot assembly 13 can be used with a PCIe expansion card under different conditions where different lane assignments are made to the first PCIe slot 131, the second PCIe slot 132 and the third PCIe slot 133. Application examples of the present invention are explained hereinafter by way of first example, second example and third example.

In the first example, a PCIe expansion card is inserted into the first PCIe slot 131, the second PCIe slot 132 and the third PCIe slot 133 receive no PCIe expansion card, the set detection pins respectively output the detected signals (DET1=1, DET2=0, DET3=0; where 0 means no PCIe expansion card in presence, 1 means the presence of a PCIe expansion card) to the logic controller 14. Based on the detected signals, the logic controller 14 enables the switch signal (SW1=Hi, SW2=Hi, SW3=X; Hi means high potential, X means regardless) to close the first contacts $S_{11},S_{21}$ and second contacts $S_{12},S_{22}$ of the first switch 121 and second switch 122 of the switch circuit 12 so as to assign two sets of PCIe 3.0×4 lanes to the first PCIe slot 131 based on channel a. Since the third switch 123 and the second switch 122 are in open circuit status, the first PCIe slot 131 can receive two sets of PCIe 3.0×4 lane signals (Lane 0~7) from the CPU 11 and two sets of PCIe 3.0×4 lane signals (Lane 8~11 and Lane 12~15) from the switch circuit 12, and therefore, it totally obtains 16 lane signals (Lane 0~7+Lane 8~15).

In the second example, the first PCIe slot 131 and the second PCIe slot 132 respectively receive a PCIe expansion card, the third PCIe slot 133 receives no PCIe expansion card, the set detection pins respectively output the detected signals (DET1=1, DET2=1, DET3=0) to the logic controller 14. Based on the detected signals, the logic controller 14 enables the switch signal (SW1=Lo, SW2=Lo, SW3=Hi; Lo means low potential) to close the first contacts $S_{11},S_{21}$ and third contacts $S_{13},S_{23}$ of the first switch 121 and second switch 122 of the switch circuit 12 so as to respectively assign two sets of PCIe 3.0×4 lanes to the second PCIe slot 132 and the third switch 123 based on channel b. Further, since the first contact $S_{31}$ and second contact $S_{32}$ of the third switch 123 are also closed at this time, the second switch 122 is switched to provide one set of PCIe 3.0×4 lanes to the second PCIe slot 132 based on channel a. Therefore, the first PCIe slot 131 can receive from the CPU 11 two sets of PCIe3.0×4 lanes (Lane 0~7), the second PCIe slot 132 can receive one set of PCIe 3.0×4 lanes (Lane 8~11) from the first switch 121 and one set of PCIe 3.0×4 lanes (Lane 12~15) from the third switch 123, thus, the first PCIe slot 131 and the second PCIe slot 132 respectively receive 8 lane signals (Lane 0~7 and Lane 8~15). Further, since the third PCIe slot 133 and the third switch 123 are in open circuit status, the third PCIe slot 133 receives no signal.

In the third example, the first PCIe slot 131, the second PCIe slot 132 and the third PCIe slot 133 respectively receive a PCIe expansion card plugged therein, the set detection pins respectively output the detected signals (DET1=1, DET2=1, DET3=1) to the logic controller 14, based on the detected signals, the logic controller 14 enables the switch signal (SW1=Lo, SW2=Lo, SW3=Lo), thereby controlling the first switch 121 and the second switch 122 to assign two sets of PCIe 3.0×4 lanes to the second PCIe slot 132 and the third switch 123 based on channel b. At this time, the first contact $S_{31}$ and third contact $S_{33}$ of the third switch 123 are closed, causing the second switch 122 to provide one set of PCIe 3.0×4 lanes to the third PCIe slot 133 based on channel b. Therefore, the first PCIe slot 131 can directly receive 8 lane signals (Lane 0~7) from the CPU 11, the second PCIe slot 132 and the third PCIe slot 133 can respectively receive 4 lane signals (Lane 8~11 and Lane 12~15).

TABLE I

Lane assignment made by the switch circuit subject to the control of the logic controller.

| DET1 | DET2 | DET3 | SW1 | SW2 | SW3 |
|------|------|------|-----|-----|-----|
| 0 | 0 | 1 | Lo | Lo | Lo |
| 0 | 1 | 0 | Lo | Lo | Hi |
| 0 | 1 | 1 | Lo | Lo | Lo |
| 1 | 0 | 0 | Hi | Hi | X |
| 1 | 0 | 1 | Lo | Lo | Lo |
| 1 | 1 | 0 | Lo | Lo | Hi |
| 1 | 1 | 1 | Lo | Lo | Lo |

As described above, the logic controller 14 automatically detects the insertion of one or multiple PCIe expansion cards in the PCIe slot assembly 13 according to the arrangement of Table I, and controls the switch circuit 12 to assign the arrangement of lanes. In addition to the implementation of automatic detection and lane assignment in the aforesaid first, second and third examples, the logic controller 14 can enable switch signals (SW1, SW2, SW3=Lo, Lo, Lo; Lo, Lo, Hi; Lo, Lo, Lo; Lo, Lo, Lo) to control the switch circuit 12 in switching channels for automatically assigning lanes to the first PCIe slot 131, the second PCIe slot 132 and the third PCIe slot 133 according to the detected signals (DET1, DET2,DET3=0, 0, 1; 0, 1, 0; 0, 1, 1; 1, 0, 1) produced subject to insertion of one or multiple PCIe expansion cards in the PCIe slot assembly 13. The design of using the logic controller 14 to automatically detect the insertion of one or multiple PCIe expansion cards in the PCIe slot assembly 13 of the motherboard 1 and to control the switch circuit 12 in assigning lanes eliminates the use of a jumper for manually switching lanes in the motherboard 1, achieving flexible arrangement of lanes according to the bandwidth of the loaded PCIe expansion card, increasing the convenience of expansion application, but also having a higher performance and expansibility to satisfy user needs.

In general, the intelligent PCIe slot lane assignment method of the invention is to be applied to a motherboard 1 comprising a CPU 11 capable of providing at least 16 lanes, a switch circuit 12, a PCIe slot assembly 13 consisting of a first PCIe slot, a second PCIe slot and a third PCIe slot, and a logic controller 14. The intelligent control of the logic controller 14 in detection of the insertion of a PCIe expansion card in the first PCIe slot 131, second PCIe slot 132 and third PCIe slot 133 of the PCIe slot assembly 13 enables the switch circuit 12 to automatically assign lanes to the first PCIe slot 131, second PCIe slot 132 and third PCIe slot 133 of the PCIe slot assembly 13 according to the detection results, increasing the convenience of expansion application and having a higher performance and expansibility.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. An intelligent PCIe slot lane assignment method applied to a motherboard comprising a CPU, a switch circuit, a PCIe slot assembly and a logic controller, said CPU providing at least 16 lanes, said PCIe slot assembly comprising a first PCIe slot, a second PCIe slot and a third PCIe slot, said logic controller being adapted to detect the insertion of a PCIe expansion card in said PCIe slot assembly and to control said switch circuit to assign said at least 16 lanes to said first PCIe slot, said second PCIe slot and said third PCIe slot according to the detection result, the intelligent PCIe slot lane assignment method comprising the steps of:
- (a) start;
- (b) said logic controller automatically detecting the insertion of an expansion card in said third PCIe slot, and then proceeding to step (c) when detected the presence of an expansion card in said third PCIe slot, or step (d) when detected no expansion card in said third PCIe slot;
- (c) said logic controller controlling said switch circuit to assign 8 said lanes to said first PCIe slot and respective 4 said lanes to said second PCIe slot and said third PCIe slot;
- (d) said logic controller automatically detecting the insertion of an expansion card in said second PCIe slot, and then proceeding to step (e) when detected the presence of an expansion card in said second PCIe slot, or step (f) when detected no expansion card in said second PCIe slot;
- (e) said logic controller controlling said switch circuit to assign respective 8 said lanes to said first PCIe slot and said second PCIe slot and assign no lane to said third PCIe slot;
- (f) said logic controller controlling said switch circuit to assign 16 said lanes to said first PCIe slot and assign no lane to said second PCIe slot and said third PCIe slot.

2. The intelligent PCIe slot lane assignment method as claimed in claim 1, wherein said CPU provides 4 sets of PCIe ×4 total 16 lanes with 2 sets of said 4 sets of PCIe ×4 lanes electrically connected to said first PCIe slot and the other 2 sets of said 4 sets of PCIe ×4 lanes electrically connected to respective input terminals of a first switch and a second switch of said switch circuit, one output terminal of said first switch and one output terminal of said second switch being respectively electrically connected to the other 2 sets of said first PCIe slot 4 sets of PCIe ×4 lanes, said first switch having the other output terminal thereof electrically connected to one set of PCIe ×4 lanes of said second PCIe slot, said second switch having the other output terminal thereof electrically connected to an input terminal of said third switch, said third switch having one output terminal thereof electrically connected to the other set of PCIe ×4 lanes of said second PCIe slot and the other output terminal thereof electrically connected to the PCIe ×4 lanes of said third PCIe slot.

3. The intelligent PCIe slot lane assignment method as claimed in claim 2, wherein in step (c), said logic controller controls said first switch and said second switch to assign 2 sets of PCIe ×4 lanes to said second PCIe slot and said third switch respectively according to the detection result, and said third switch to switch said second switch in assigning one set of PCIe ×4 lanes to said third PCIe slot so that said first PCIe slot obtains 8 lanes from said CPU; said second PCIe slot and said third PCIe slot respectively obtain 4 lanes.

4. The intelligent PCIe slot lane assignment method as claimed in claim 2, wherein in step (e), said logic controller controls said first switch and said second switch to assign 2 sets of PCIe ×4 lanes to said second PCIe slot and said third switch respectively according to the detection result for enabling said first PCIe slot to directly obtain 8 lanes from said CPU, said logic controller also controls said third switch to switch said second switch in assigning one set of PCIe ×4 lanes to said second PCIe slot so that said first PCIe slot and said second PCIe slot respectively obtain 8 lanes.

5. The intelligent PCIe slot lane assignment method as claimed in claim 2, wherein in step (f), said logic controller controls said first switch and said second switch to assign 2 sets of PCIe ×4 lanes to said first PCIe slot according to the detection result so that said first PCIe slot obtains 8 lanes directly from said CPU and 2 sets of PCIe ×4 lanes from said first switch and said second switch, and therefore said first PCIe slot totally obtains 16 lanes.

6. The intelligent PCIe slot lane assignment method as claimed in claim 1, wherein said PCIe slot assembly comprises at least one PCIe ×16 slot, at least one PCIe ×8 slot and at least one PCIe ×4 slot.

7. The intelligent PCIe slot lane assignment method as claimed in claim 1, wherein said PCIe slot assembly comprises at least one PCIe ×16 slot and one or two PCIe ×8 slots.

8. The intelligent PCIe slot lane assignment method as claimed in claim 1, wherein said first PCIe slot meets PCIe 3.0×16 specifications.

9. The intelligent PCIe slot lane assignment method as claimed in claim 1, wherein said second PCIe slot meets PCIe 3.0×8 specifications.

10. The intelligent PCIe slot lane assignment method as claimed in claim 1, wherein said third PCIe slot meets PCIe 3.0×4 specifications.

* * * * *